United States Patent Office 2,918,214
Patented Dec. 22, 1959

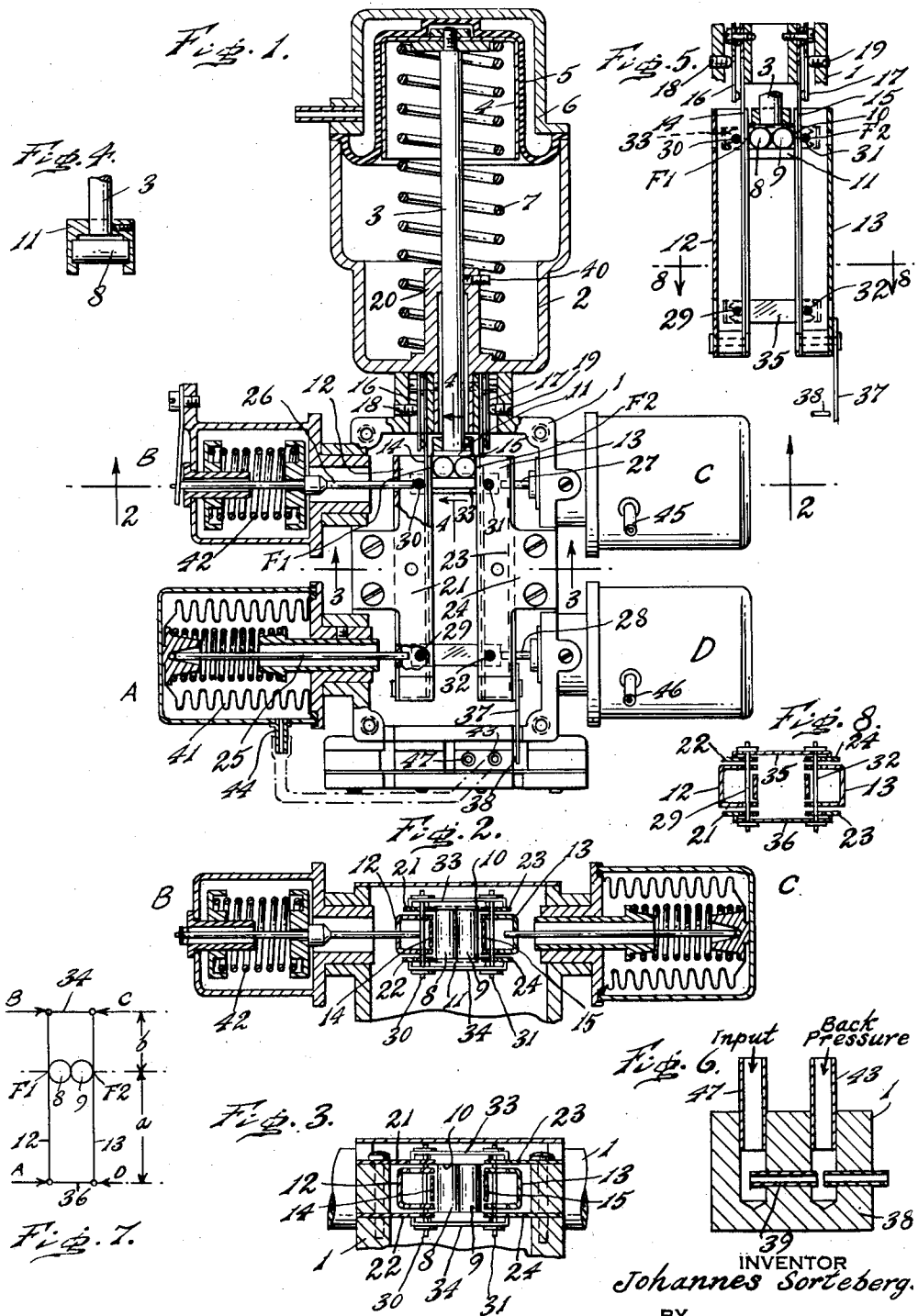

2,918,214
AUTOMATICALLY BALANCED WEIGHBEAM SYSTEMS

Johannes Sorteberg, Darien, Conn.

Application May 20, 1958, Serial No. 736,562

3 Claims. (Cl. 235—61)

The object of my present invention is to devise a novel automatically balanced weighbeam system which can be used as a ratio totalizer for addition or subtraction, and which, when combined with auxiliaries, for controlling other devices and mechanisms.

A further object of the invention is to devise a mechanical expression for the equation $$A = \frac{b}{a}(B-C) + D$$

where A, B, C and D represent forces and $a$ and $b$ are variable arms of a weighbeam system. Reference is made to my prior Patent No. 2,643,055 in which I have described and broadly claimed an automatically balanced force bridge for the solution of the equation $$A \times B = C \times D$$

A further object of the invention is to devise a novel weighbeam system having two opposing weighbeams interconnected to form a rectangular arrangement capable of flexing or pivoting at the corner portions. Each weighbeam has a movable fulcrum and the two fulcrums are in fixed relationship with each other. Means are provided for manually or automatically moving said fulcrums, and means are provided for balancing the moments of the weighbeam system by changing one of the forces transmitted to the system.

A further object of the invention is to devise a novel construction, arrangement and interconnection of the component parts to obtain the results herein set forth.

With the foregoing and other objects in view as will hereinafter clearly appear, my invention comprehends a novel automatically balanced weighbeam system.

For the purpose of illustrating the invention, I have shown in the accompanying drawings a preferred embodiment of it which I have found in practice to give satisfactory and reliable results. It is, however, to be understood that the various instrumentalities of which the invention consists can be variously arranged and organized, and the invention is not limited, except by the scope of the appended claims, to the exact arrangement and organization of these instrumentalities as herein set forth.

Figure 1 is a schematic view, in elevation and partly in section, of an automatically balanced weighbeam system, embodying my invention.

Figure 2 is a section on line 2—2 of Figure 1.
Figure 3 is a section on line 3—3 of Figure 1.
Figure 4 is a section on line 4—4 of Figure 1.
Figure 5 is a sectional detail of certain of the component parts.
Figure 6 is a sectional view of the nozzle assembly.
Figure 7 is a diagram of the forces.
Figure 8 is a section on line 8—8 of Figure 5.

Similar numerals of reference indicate corresponding parts.

Referring to the drawings:

A body portion 1 has an air motor AM, the base 2 of which is mounted on the body portion 1. The air motor has a rod 3 mounted in it for linear movement and its outer end is connected to a cup 4 having a diaphragm 5 within a housing portion 6 mounted on the base 2. A spring 7 opposed inward movement of the rod 3.

Fulcrum rollers 8 and 9 are confined in a raceway 10 of a cage 11, see more particularly Figure 4, and the inner end of the rod 3 is fixed to the cage 11. The raceway 10 permits free lateral movements of the fulcrum rollers and prevents relatively longitudinal movement of the rollers.

The weighbeams 12 and 13 are suspended from the body portion by leaf springs 14 and 15 which are laterally adjustable by levers 16 and 17 and screws 18 and 19. The contact lines between the fulcrum rollers 8 and 9 and the weighbeams become the fulcrums F1 and F2.

The rod 3 is guided in a bearing 20 in the air motor base and cage 11, which, in turn, is confined between guide plates 21, 22, 23 and 24. The fulcrum rollers 8 and 9 bridge across the guide plates which absorb the difference, if any, between forces A plus B and the opposing forces C plus D, produced by load cells A, B, C and D which act upon the weighbeams through thrust rods 25, 26, 27 and 28. These thrust rods are perpendicular to the weighbeams and pairwise on the same center line.

The weighbeams 12 and 13 are U shaped and equipped with pins 29, 30, 31 and 32 which arbsorb the thrust of the rods. The contact lines between the rods and pins become the end fulcrums of the weighbeams. Weighbeams 12 and 13 are spaced from each other at each end so that only one fulcrum F1 or F2 contacts a weighbeam at a time. The manner of interconnecting the weighbeams is shown in Figures 2, 3 and 8. Pins 29 and 30 are interconnected at both ends by members 33 and 34, and pins 31 and 32 are interconnected by members 35 and 36. It will thus be clear that the two weighbeams are interconnected in the shape of a rectangle with its corners flexing or pivoting. For the purpose of this invention, the two weighbeams act as a single weighbeam. This weighbeam construction has an extension 37 which faces the nozzle of a nozzle assembly 38, the nozzle having a restriction 39.

The fulcrum rollers may be positioned manually and locked in position by a set screw 40 locking with the rod 3, or pneumatically and automatically as in Figure 1. This construction and arrangement permits the fulcrum rollers to be positioned anywhere along the weighbeams.

Load cells C and D are assumed to be of the same construction as load cell A and have a bellows 41, and load cell B has a spring 42.

The back pressure tap 43 of the nozzle assembly is connected with the tap 44 of load cell A. Taps 45 and 46 are loading connections for load cells C and D. 47 is the nozzle input tap.

In the operation, air is introduced to the nozzle at input tap 47 and the back pressure is piped from tap 43 to the load cell whose force it is desired to automatically control, in this case to tap 44 of load cell A.

In normal operation, the forces represented by A, B, C, and D are exerted on the weighbeam through the media of bellows or springs. Any one or two of the variable forces can be eliminated since it is only necessary to have one force to balance against another force.

When the system is in equilibrium, see Figure 7, $$(A-D) \times a = (B-C) \times b$$

or $$A = \frac{b}{a}(B-C) + D$$

If any of the variables are changed, i.e.

$$\frac{b}{a}$$

B, C, or D, the equilibrium will be disturbed and cause the weighbeam extension 37 to move towards or away from the nozzle, as the case may be. This will correspondingly raise or lower the back pressure from the nozzle, which, when transmitted to load cell A, will increase or decrease force A until balance is restored.

By removing the air motor housing, bellows and spring, the rod 3 can be manually adjusted to position the fulcrum rollers.

Having thus described my invention, what I claim as new and desire to secure by Letters Patent is:

1. A weighbeam system, comprising two opposing, parallel weighbeams, interconnecting linkage forming a rectangular structure of said weighbeams capable of flexing or pivoting at its corner portions, means to transmit a force to each end of each weighbeam, movable fulcrum means for both weighbeams, means for moving said fulcrum means, and means for balancing the moments of the weighbeam structure by changing one of the forces transmitted to the weighbeam structure.

2. A weighbeam system, comprising two opposing, parallel weighbeams, interconnecting linkage forming a rectangular structure of said weighbeams capable of flexing or pivoting at its corner portions, means to transmit a force to each end of each weighbeam, movable fulcrum means for both weighbeams, means for automatically moving said fulcrum means, and means for balancing the moments of the weighbeam structure by changing automatically one of the forces transmitted to the weighbeam structure.

3. A weighbeam system, comprising two opposing, parallel weighbeams, interconnecting linkage forming a rectangular structure of said weighbeams, a resilient mounting for said weighbeam structure, means to transmit a force to each end of each weighbeam, movable fulcrum means for each weighbeam, means for moving said fulcrum means, and means for balancing the moments of the weighbeam structure by changing automatically one of the forces transmitted to the weighbeam structure.

References Cited in the file of this patent

UNITED STATES PATENTS

| | | |
|---|---|---|
| 2,643,055 | Sorteberg | June 23, 1953 |
| 2,736,199 | Ibbott | Feb. 28, 1956 |